Figure 1:
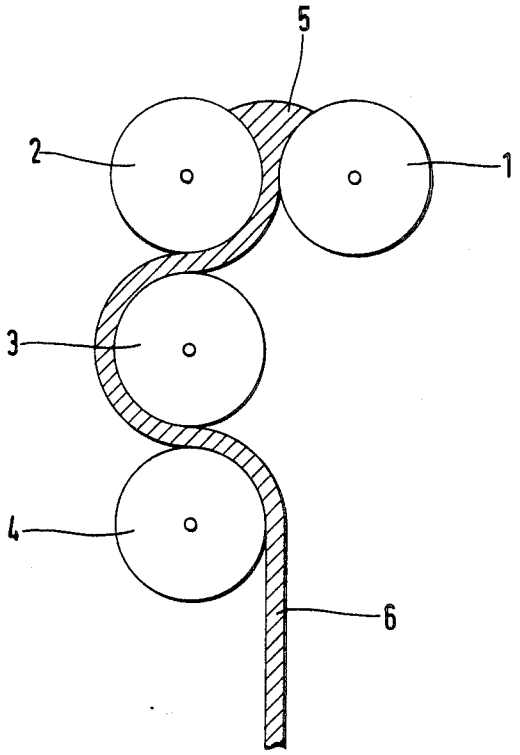

United States Defensive Publication [19] (H) [11] T973,011

Waghorn [43] Aug. 1, 1978

[54] CALENDERABLE PROPYLENE POLYMER COMPOSITIONS

[76] Inventor: Peter Ernest Waghorn, 29 Brockswood La., Welwyn Garden City, Hertfordshire, England

[21] Appl. No.: 812,439

[22] Filed: Jul. 1, 1977

[30] Foreign Application Priority Data

Jul. 13, 1976 [GB] United Kingdom ..... 29059/76
Mar. 29, 1977 [GB] United Kingdom ..... 13126/77

[51] Int. Cl.[2] ..... C08L 91/00
[52] U.S. Cl. ..... 260/23 H; 260/42.46; 260/45.85 R; 260/45.95 R

[57] ABSTRACT

Crystalline polypropylene compositions of low melt flow index which can be calendered into foils having a melt flow index of below 5 are obtained by using a soap and a particulate inorganic material together with highly effective stabilizer systems. Low melt flow index polypropylene polymers and copolymers are rendered adequately resistant to degradation while in the molten state associated with a calendering process. A composition calenderable into foils and which comprises:

a. a crystalline homopolymer of propylene and/or a crystalline copolymer of propylene with up to 25%, preferably from over 5 up to 17%, by weight of ethylene,
b. from 0.1 to 1.5%, preferably 0.15 to 0.3%, by weight of a "highly effective stabilizer system" as defined below,
c. from 0.1 to 2.0%, preferably 0.15 to 0.8%, by weight of a soap as described, and
d. 10 to 60%, preferably 15 to 45% by weight of a solid particulate inorganic material is described.

The percentages quoted are based on the weight of the polymer and/or copolymer present in the composition.

Preferred highly efficient stabilizers are pentaerythritol tetra-$\beta$-3,5-ditertiary butyl-4-hydroxyphenyl propionate and tris(3,5-ditertiary butyl-4-hydroxybenzyl) isocyanurate but stabilizers such as 2,6-ditertiary butyl-4-methyl phenol or 1,1,3-tris(2'-methyl-5'-tertiary butyl-4-hydroxy phenyl) butane are also effective.

18 Claims, 1 Sheet Drawing,

20 Pages Specification

The file of this unexamined application may be inspected and copies thereof may be purchased (849 O.G. 1221, Apr. 9, 1968).